3,489,676
NOVEL OIL TREATMENT AND LUBRICATING OIL FILTERS FOR INTERNAL COMBUSTION ENGINES

Shih-En Hu, Roselle, and Jerome Geyer, Elizabeth, N.J., assignors to Esso Research and Engineering Company, a corporation of Delaware
No Drawing. Filed Sept. 5, 1967, Ser. No. 665,249
Int. Cl. C10m *11/00;* B01d *39/14*
U.S. Cl. 208—179                                   28 Claims

ABSTRACT OF THE DISCLOSURE

Lubricating oil treatment for internal combustion engines involves the circulation of such oil from the engine through an oil filter and returning the filtered oil to the engine. The system contains in the filter chamber, in the filter cartridge contained within the chamber, or in another chamber located either before or after the filter chamber, at least one relatively oil-insoluble, solid, inorganic reducing compound having a cation moiety and an anion moiety, wherein at least the anion moiety provides the reducing action and possesses an E° oxidation-reduction potential greater than —0.8 when measured in an aqueous acid solution or greater than 0 when measured in an aqueous alkaline solution.

Compounds containing phosphorus in the anion moiety or as the anion moiety wherein the oxidation valence state of the phosphorus is —3, —2, +1, +3, or +4 and compounds containing sulfur in the anion moiety or as the anion moiety wherein the oxidation valence state of the sulfur is —2, +2, +3, or +4 are used in the filter to effect the reducing action.

Ammonium, hydrogen, or metal phosphides, hypophosphites, metaphosphites, pyrophosphites, orthophosphites, hypophosphates, sulfides, sulfoxylates, hyposulfites, sulfites, and dithionites are preferred reducing agents.

The cation moiety may be an ammonium, a metal, or a hydrogen ion, with the metal ion being in either its highest valence state or a lower valence state in those cases where the metal ion exists in more than one valence state.

Inert filter elements within the filter may be in layer form interspersed with solid particles of the reducing compound or the reducing particles in solution form may be impregnated into the porous filter elements such as porous paper, diatomaceous earth, kaolin, kieselguhr, activated clay, charcoal, and fuller's earth. Optionally, a separate chamber containing retained solid particles may be inserted in the oil circulation system either before or after the oil filter. The preferred reducing compounds are those of the ammonium radical, the alkali metals, and the alkaline earth metals. Both water-soluble and water-insoluble inorganic reducing compounds are utilizable provided, however, that the additives employed in the system are of relatively oil-insoluble nature.

DESCRIPTION OF THE INVENTION

The present invention relates to a lubricating oil circulating system used in association with internal combustion engines and which involves the circulation of mineral lubricating oil from the crankcase of internal combustion engines, through a filter, and the return of the filtered oil into the internal combustion engine for reuse therein. More particularly, the invention relates to oil filters and, optionally, a chamber ahead of or after the oil filter for contacting the oil with inorganic reducing compounds wherein there is contained in the oil filter, in a filter cartridge contained with the oil filter, or in the said contact chamber, at least one relatively oil-insoluble solid inorganic reducing compound having a cation moiety and an anion moiety in which the anion moiety provides the reducing action and possesses an E° oxidation-reduction potential greater than —0.8 when measured in an aqueous acid solution or greater than 0 when measured in aqueous alkaline solution. By incorporating such materials into the filter or other chamber, in the solid state either as lumps, particles, or impregnated into the filter packing material, it is possible to maintain the lubricating oil in a fresher condition and freer from sludge and decomposition products with a minimum of corrosion-forming tendencies than has heretofore been possible to attain.

Lubricating oils, especially those used for the lubrication of internal combustion engines, are required to withstand severe superatmospheric temperature conditions. Their failure to withstand such temperatures leads to rapid decomposition or oxidation of such oils with the resultant formation of oxidized hydrocarbons such as carboxylic acids, aldehydes, ketones, and the like. The oxidative degradation of lubricating oils is a problem which has existed for many years and is becoming more pressing for a solution with advancing technology and present day requirements for lubricating oils having temperature stability when temperatures of the oil approach 300° F. and 400° F. under heavy duty service conditions. Many attempts have been made to impart to lubricating oils operating under severe service conditions, oxidative stability so that these oils, over longer periods of time, resist oxidative degradation with the resultant accompanying sludge formation and the attendant difficulties encountered by reason of such sludge formation. Corrosion of the metal internal surfaces of engines lubricated with oils is also of grave consideration under these extreme conditions of engine operation. Additionally, nitrogen in the air introduced into combustion chambers and subjected to combustion becomes fixed so that nitrates are eventually formed. These substances find their way into the crankcase and become mixed with the lubricating oil. It is already well known that the presence of nitrates in such oils induces rapid sludge formation. It is, therefore, desirable to convert nitrate ions therein, into nitrite ions and to maintain a minimum of nitrate ions in the oil in order to avoid as much sludge formation as possible.

In the past, the formation of degradation products has been reduced to some extent by the addition of organic oxidation inhibiting agents to the oils for the purpose of reducing or delaying sludge formation. In many instances, although these objectives are accomplished because of the nature of the specific additive employed, other characteristics such as thermal stability, changes in viscosity, viscosity index, and lubricity, etc. are simultaneously adversely affected. Most of the organic addition agents heretofore employed have a high degree of oil solubility because it is desired that these agents intimately contact all portions of the oil, the bearing surfaces and the internal metal surfaces of the engine during its operation. Many times it has been necessary to add an excess of these organic inhibiting substances in order that the point at which they have been completely consumed or broken down will substantially coincide with the point and time of use at which the oil will normally be replaced anyhow. However, such "overcharging" of the oil with an oxidation inhibitor sometimes results in a tendency to accelerate the sludge formation in the oil either because of the inherent increased acidity or alkalinity of the additive employed, its thermal instability, and/or by reason of some adverse synergistic or catalytic effect imparted to the oil during use. The problem has most always been attacked by attempting to homogeneously distribute the desired antioxidant or neutralizing agents to the entire quantity of the oil present in the engine for the entire length of time that the oil is present in the engine. This, of course, has meant that the additive must be completely soluble or almost completely soluble in the oil.

The present invention is directed to the correction of the problems of sludge formation and corrosion that have previously existed. However, a different approach is involved. Instead of attempting to impart oxidative resistance to the oil by means of oil-soluble additives, resort is had to the use of agents which are, for the most part, more water-soluble than they are oil-soluble because it has now been recognized that, to a large extent, the corrosiveness of the degraded oil comes about by reason of a first formation of oxidized species of hydrocarbons in the oil and eventually a presence of water. The hereinafter described novel procedure dose not attempt to insure the complete absence of oxidized species and water in the lubricating oil system, but it assures a quick and prompt treatment of these substances with inorganic substances of a reducing nature which tend to minimize the oxidative characteristic of such species and water. This, in turn, tends to minimize the oxidative breakdown of the oil with its resultant and attendant sludge formation which has been found to be so troublesome from the standpoint of engine cleanliness and lubricity maintenance. The polar species formed by the oxidation of lubricating oil are more readily soluble in a polar solvent like water than a non-polar solvent like lubricating oil. To some extent, lubricating oils in internal combustion engines encounter oxidative breakdown by reason of the presence of oxygen in the crankcase accompanied by the high temperature imparted to the oil by reason of the operation of the engine. It is believed that the accelerated oxidative breakdown of the oils comes about by reason of the presence of oxidized species and/or nitrate ions in association with the oil.

The substances, which are solid, inorganic in nature, relatively oil insoluble, and of a reducing nature, are of the type previously described. They are, for the most part, either compounds of phosphorus or of sulfur wherein both the phosphorus and the sulfur are in the anion portion of the compound with the sulfur having an oxidative valence state of $-2$, $+2$, $+3$, or $+4$, i.e., a valence state something less than its completely oxidized form which would be $+6$, and with the phosphorus having an oxidative valence state of $-3$, $-2$, $+1$, $+3$, or $+4$, i.e., something less than $+5$ which is the fully oxidized valence state of phosphorus. So long as these materials are solid at ambient temperatures, the cation portion may be the ammonium ion, hydrogen ion, or any metal ion, the last mentioned ion being either in its highest valence state or a lesser valence state if it is a metal ion having a multivalent state. Such multivalent cations, in lower valence state, for example ferrous, cuprous, chromous, stannous, etc. also exert a reducing effect. The sulfur compound having cations whose reducing effect is utilized comprise the sulfides, sulfoxylates, hyposulfites, sulfites, and dithionites. The phosphorus compounds whose ions have a desired reducing effect comprise the phosphides, hypophosphites, metaphosphites, pyrophosphites, orthophosphites, and hypophosphates. The effectiveness of these reducing anions must be on the basis of their $E^o$ oxidation-reduction potentials which, when measured in aqueous acid solution, are greater than $-0.8$, or, if measured in aqueous alkaline solution, are greater than 0. Reference for the definition of $E^o$ is found in the book authored by Wendell M. Latimer, entitled Oxidation Potentials, second edition, fifth printing (August 1961), pages 2 and 3, and the potential values for the various oxidation-reduction couples are to be found in Tables 84 and 85 appearing at pages 339–348. The E values shown in this description, examples, and appended claims are those given only for the next higher single oxidative stage. This does not exclude the additional reducing benefit to the oil derived from the further oxidation of the initially formed oxidation products where further oxidation does, in fact, take place. Thus, for example, the initial oxidation-reduction potential ($E^o$) value for the conversion of the hypophosphite anion to the phosphate anion involves a potential of $-0.38$ which, in 111, top of the page, of the aforementioned Latimer book. The further oxidation of this oxidized anion to the hypophosphate anion involves a potential of $-0.38$ which, in turn, may be further oxidized to a final oxidation state of the phosphate ion involving an $E^o$ of 0.94. Similarly, page 81 of the same book, showns an $E^o$ value for conversion of sulfur anion to elemental sulfur of $-0.14$, which sulfur, in turn, is further oxidized to the anion $S_5O_6$ at $E^o$ of $-0.49$ and then to $H_2SO_3$ at $E^o$ of $-0.41$ and then finally to the sulfate anion at $E^o$ of $-0.17$. All $E^o$ values, measured in acid solution, greater than $-0.8$ will be effective in reducing nitrate ion to nitrite ion and will thus be effective in inhibiting sludge formation. From a description of the definition of $E^o$, it is obvious that the potential values are measured under standard conditions. All these references to the Latimer book are incorporated herein by reference. Thus, for example, the next higher oxidative state of a metal sulfide or hydrogen sulfide shows an $E^o$ value of $-0.14$. For a sulfoxylate or sulfoxylic acid, the next higher oxidative state shows an $E^o$ value greater than $-0.5$. For the next higher oxidative state of a hyposulfide or hyposulfurous acid, an $E^o$ value of 0.08, or for a sulfurous acid or a sulfite, an $E^o$ value of $-0.17$ is shown. These are when measured in an aqueous acid solution. All of the values are more than $-0.8$ and they exclude anions having a reducing effect such as nitrite oxidized to nitrate which has, in acid solution, an $E^o$ value of $-0.94$. In order to effect nitrate anion reduction to nitrite, the $E^o$ values for the net effect of the compound used must be greater than $-0.94$. Ferrous sulfate is effective to accomplish this for, although the sulfate anion is in a fully oxidized state, the oxidation-reduction potential of the ferrous cation oxidized to the ferric cation is $-0.77$ in acid solution, which value is greater than $-0.8$. On the other hand, manganous sulfate would be ineffective for its $E^o$ potential is about $-1.5$ in its oxidation to manganic sulfate.

In the case of the phosphorus-containing anions, again as measured in aqueous acid solutions, the oxidation of the hypophosphite anion to the next higher oxidation state, namely, the phosphite ion, the $E^o$ value is 0.5. The oxidation-reduction potential of the orthophosphite anion to phosphate anion, the $E^o$ value is 0.276 and for the hypophosphate anion to the phosphate anion the $E^o$ value is 0.94. Again, all values are greater than $-0.8$, which insures that any nitrate ions present in the oil will be converted into nitrite cations thus avoiding the deleterious sludge formation action in the oil.

The cation may be hydrogen in which case the acids are the compounds employed or it may be any metal ion or the equivalent of a metal ion, namely, the ammonium ion. As before stated all compounds must be relatively oil-insoluble, i.e., they may be very slightly soluble in oil but are relatively oil insoluble, and they may be water soluble or insoluble. In some instances the use of the ammonium or metal compounds will depend upon their preferential solubility in water, slight as it may be, for the reason that some water of condensation and water of combustion inevitably finds its way into the lubricating oil in the crankcase of internal combustion engines during their operation. Because of the reducing nature of the inorganic solid compounds present in the filter, on a carrier or as lumps or granules in the filter, or in a separate contacting chamber, the harmful effects of oxygen, either in uncombined or combined form (as oxidized degradation products), are minimized. In comparative tests of engine lubricating oils passing through filters containing the aforementioned types of reducing agents, in the operation of internal combustion engines, the life of the oil was enhanced by reason of minimizing the oxidative degradation of such oils; resulting in up to 50% to 60% longer use without resorting to further treatment, removal, or replacement.

Any inorganic hydrogen, metal, or ammonium reducing compound meeting the aforementioned requirements is useful in practicing the process of the instant invention. Chiefly, however, those compounds of reducing nature in which the reducing activity is afforded by reason of the anion moiety of the compound in contrast to the cation moiety and having some slight degree of water solubility and being, for the most part, nearly completely insoluble in the lubricating oils are preferred for use. As representative of these types of materials to be used in the filter in their solid form or to be impregnated into the filter element contained in a filter, any one or more of the following are useful:

| | |
|---|---|
| Ammonium sulfide | Stannic sulfide |
| Ammonium pentasulfide | Stannous sulfide |
| Sodium monosulfide | Silver sulfide |
| Sodium disulfide | Lead sulfide |
| Sodium trisulfide | Vanadium disulfide |
| Sodium pentasulfide | Vanadium trisulfide |
| Lithium sulfide | Vanadium pentasulfide |
| Potassium monosulfide | Antimony trisulfide |
| Potassium disulfide | Antimony pentasulfide |
| Potassium trisulfide | Bismuth sulfide |
| Potassium tetrasulfide | Chromium tetrasulfide |
| Potassium pentasulfide | Molybdenum disulfide |
| Calcium sulfide | Molybdenum tetrasulfide |
| Cupric sulfide | Tungsten disulfide |
| Cuprous sulfide | Tungsten trisulfide |
| Barium tetrasulfide | Manganic sulfide |
| Barium trisulfide | Ferric sulfide |
| Barium sulfide | Ferric tetrasulfide |
| Aluminum sulfide | Ferrous sulfide |
| Zinc sulfide | Cobaltic sulfide |
| Cadmium sulfide | Cobaltic disulfide |
| Cesium sulfide | Nickel sulfide(NiS) |
| Cesium disulfide | Nickel subsulfide($Ni_2S$) |
| Cesium trisulfide | Nickel sesquisulfide($Ni_3S_4$) |
| Cesium pentasulfide | Platinum sulfide |
| Magnesium sulfide | Platinum disulfide |
| Mercuric sulfide | Palladium sulfide |

As representative of the sulfites, sulfoxylates, thiosulfites and dithionites that may be employed, any one or more of the following may be used:

| | |
|---|---|
| Ammonium sulfite | Lithium hypophosphite |
| Ammonium acid sulfite | Potassium hypophosphite |
| Potassium sulfite | Sodium hypophosphite |
| Potassium acid sulfite | Sodium pyrophosphite |
| Sodium sulfite | Disodium pyrophosphite |
| Sodium acid sulfite | Zinc hypophosphite |
| Silver sulfite | Ammonium hypophosphite |
| Barium sulfite | Ammonium dihydrogen orthophosphite |
| Calcium sulfite | Magnesium hypophosphite |
| Zinc sulfite | Magnesium orthophosphite |
| Magnesium sulfite | Nickel hypophosphite |
| Ferric sulfite | Manganese hypophosphite |
| Ferrous sulfite | Manganese orthophosphite |
| Lead sulfite | Lead orthophosphite |
| Nickelic sulfite | Ferric hypophosphite |
| Sodium dithionite | Ferric phosphides (mono, di, and tri) |
| Zinc sulfoxylate ($ZnSO_2$) | Cobalt hypophosphite |
| Cobaltous sulfoxylate ($CoSO_2$) | Cadmium hypophosphite |
| Magnesuim thiosulfite | Cadmium phosphide |
| Sodium thiosulfite | Calcium phosphide |
| Calcium thiosulfate | Nickel phosphide |
| Barium dithionite | Zinc phosphide |
| Hypophosphorous acid | Diammonium pyrophosphite |
| Metaphosphorous acid | Calcium pyrophosphites |
| Pyrophosphorous acid | Barium pyrophosphite |
| Orothophosphorous acid | Trisodium diphosphite |
| Hypophosphoric acid | Tetrasodium hypophosphate |
| Barium hypophosphite | Trisodium isohypophosphate |
| Calcium orthophosphite | Magnesium hypophosphite |
| Calcuim hypophosphite | Magnesium hypophosphate |
| Sodium monohydrogen orthophosphite | Calcium hypophosphate |
| Sodium dihydrogen orthophosphite | Cuprous hypophosphate |
| Potassium monohydrogen orthophosphite | Cupric hypophosphate |
| Potassium dihydrogen orthophosphite | Sodium, potassium hypophosphate |
| | Potassium, cobalt hypophosphate |

Many of the phosphorus reducing type compounds mentioned above, as well as many others, which could be employed having similar reducing activity and of the required $E^0$ potential, are disclosed in the publication Phosphorous and Its Compounds, volume I, chapter 7, John R. VanWazer, Interscience Publishers (1958).

The aforementioned compounds often exist as anhydrides, and are readily available in the open market. They may be employed in this form. Likewise, in many instances, the hydrates of the aforementioned compounds are most readily commercially available. Such compounds exist with one or more molecules of water of crystallization in association with their structure. Since these are more commonly marketed and are thus generally more readily available, there is little point in attempting to employ the anhydrous form of the reducing compounds. In any event, when the anhydrous forms of the compounds are incorporated into the oil filter in association with filter packing or otherwise used, almost immediately the hydrate form, if it forms, actually is produced since the oil eventually will contain small amounts of water and the anhydrous salts are eventually thus converted into the hydrate form. In effect, and with continued use of the aforementioned types of reducing agents, the hydrate form, where it is possible to form, will actually be the substance contacting the oil. Mixtures of the sulfur-containing anion compounds and the phosphorus containing anion compounds are contemplated as well as mixtures of two or more types of compounds alone or in admixture with the other types of compounds such as ferrous sulfate or cuprous sulfate, for example. Solid particles may range in size from between about —4 and about +150 mesh, preferably between about +20 and about +40 mesh Tyler screen size. The solid particles should not be, in any event, of sufficiently small size that any substantial quantity of them will pass through the filter packing material and be circulated in the oil. If they are of sufficiently small particle size that they behave substantially as colloids in the oil, no harm is done since their reducing action will still be effective on the degradative products in the oil.

Another method which may be employed for incorporating the reducing compounds into the oil filter is to impregnate the filter packing material with an aqueous solution of such salts, in cases where the salts are readily water soluble, after which the impregnated material, for example, porous paper packing, may be gently heated to dryness to drive off the water and to maintain the compounds in intimate association with the packing material. No specific minimum amount of the reducing compound is necessary or found to be critical, it being sufficient that all or a portion of the filter element, i.e., the packing in the filter, either contain impregnated thereinto one or more of the aforementioned compounds in solid form or that solid particles sufficient to inhibit corrosion and sufficiently large to be retained in the filter element are placed in and retained by the filter element. Solid particles of sufficient coarseness to be retained in the filter by the filter element or the filter packing material may be positioned at the inlet side of the filter or between layers of filter packing material so as to be largely retained therein for the service life of the filter or the coarse solid particles may be in a separate chamber in the oil circulation system ahead of or after a conventional oil filter. Usually, in the latter case, a fine mesh screen (i.e., 50 to 100 mesh) serves as a support and retainer for the solid particles.

No specific structural design of the filter element is necessary. Preferably, the solid particles of reducing agents should be retained in the filter and not be entrapped or carried with the oil from the filter packing chamber, or filter to the engine, although some small amounts in colloidal form or dissolved in the entrained water may be removed from the filter and be carried into the crankcase oil sump. In ordinary automotive internal combustion engines having an oil capacity of 5 or 6 quarts of lubricating oil, the oil filter or other chamber should contain, either as such or impregnated on the filter medium, between about 10 and about 150 grams of the selected reducing agent or agents in solid form. Such an amount is sufficient to enable the filter to retain, during its normal life of operation, solid salts over and beyond that amount taken up by any water with which the solid compounds come into contact during the course of the normal operation of the engine between oil changes. If desired, however, it is of course proper that larger or smaller amounts of such compounds be incorporated depending upon the particular usage of the engine and the amount of engine running time elapsing between filter changes or chamber rechargings.

If a filter, or carrier medium, is to be employed (in practical operation this is advantageous) it is preferable that it be a relatively porous carrier and that it be relatively inert with respect to the oil and to the reducing compounds. Any inert carrier is suitable, particularly a porous one, so long as the size of the solid particles is sufficiently large to retain the particles in the filter during operation of the engine and during the circulation of the oil through the filter. Suitable carrier substances include porous paper, diatomaceous earth, kaolin, kieselguhr, activated clay, charcoal, or fuller's earth, although any other inert, relatively porous or nonporous carrier is equally as useful so long as the carrier acts as a filtering medium and retains the solid reducing compounds within the filter and solids-free oil as an effluent from the filter is permitted to be returned to the engine for reuse. In some cases, even coarse sand may serve as the filtering medium so long as it is retained within the filter and is not carried by the effluent oil to the engine.

The oils employed in association with the present invention are those customarily employed in lubricating internal combustion engines including automotive engines, Diesel engines, both of the light and heavy duty types, and, in fact, for lubricating any engine employing lubricating oils for the purpose of lubricating the bearings, piston walls, valves, etc. of such engines. These oils are many and of varied types. The invention and its success in the use of the reducing agents in oil filters does not depend upon the use of any particular lubricating oil but is applicable to all such oils heretofore used in these lubrication systems. As is well known and recognized, these oils may be of paraffinic, naphthenic or mixed types and they may contain the conventional additives which are customarily employed in such oils such as, for example, viscosity index (V.I.) improvers, pour point depressants, antioxidants, sludge dispersants, antiwear agents, etc.

In the comparative runs set forth in the example, a base blend of solvent-extracted, neutral, Mid-Continent oil was employed. It contained conventional additives, namely, a V.I. improver, a dispersant, a pour point depressant, an antioxidant, and an antiwear agent. The oil, as compounded, had a pour point of about $-20°$ F. maximum, and a V.I. of 136 minimum.

As illustrative of the character of the invention, the following example is given:

EXAMPLE

A Ford 6-cylinder engine was run through alternate temperature cycles. The oil employed was that previously described. In one series of tests, a filter commercially available and employed as a standard filter on automotive engines and consisting of a porous paper packing or filter element had interspersed into the paper filter element about 52 grams of calcium sulfide (sulfide anion, $$E° = -0.14$$

to sulfur) of about 20 to 40 mesh average particle size, standard Tyler screen sizes. A second run was made using a like amount of calcium hypophosphite (hypophosphite anion, $E° = 0.50$ to phosphite state) of the same particle size. A third test was carried out using the same type of filter with the same type of filter packing element but had interspersed therein about 52 grams of ferric hypophosphite ($E° = 0.50$) having a size of about 20 to 40 mesh average particle size, according to the standard Tyler screen sizes and under comparative conditions, a final test using sand of 30–40 mesh size was used. The comparative cyclic temperature sludge tests were carried out as follows:

The Ford 6-cylinder engine was run through alternate temperature controlled cycles. The spark timing was set at 11° BTC (before top center). The air to fuel ratio was maintained between 13.7:1 and 14.5:1 and the engine was placed under constant load of 140 foot lbs. of torque and was run at 1500 r.p.m., ±15 r.p.m. The first cycle lasted 5 hours and the oil sump temperature was maintained at 150° F., ±5° F. Following this, a second cycle lasted 2 hours, the oil sump temperature being maintained at 215° F., ±5° F. The two cycles were alternated, in sequence, until the desired total test hours had elapsed. Make-up oil was added as required so as to maintain the oil level in the crankcase at all times between about 5 and 5½ quarts. At the end of selected periods of test time, the engine was inspected by disassembling it sufficiently to permit visual examination of several of the parts, including the rocker arm assembly, rocker arm cover, the cylinder head, the push rod chamber and its cover, the crank shaft, and the oil pan. These parts were visually and quantitatively rated for sludge deposits using a CRC (Coordinating Research Council) Sludge Merit Rating System in which a numerical rating of 10 represents a perfectly clean part and the numerical scale decreases to a minimum value representing a part covered with the maximum amount of sludge possible. The sludge merit ratings are averaged to give an over-all engine merit rating. In all tests, the filter element was one made of paper and is readily available on the open market. The comparative tests gave the following data:

TABLE I.—SLUDGE MERIT RATING CYCLIC TEMPERATURE ENGINE TESTS

| Test hours | Calcium hypophosphite | Ferric hypophosphite | Calcium sulfide | Sand |
|---|---|---|---|---|
| 63 | 9.99 | 9.82 | 9.97 | 9.92 |
| 84 | 9.89 | 9.79 | 9.87 | 9.84 |
| 105 | 9.85 | 9.76 | 9.46 | 9.47 |
| 126 | 9.81 | 9.42 | 9.42 | 9.15 |
| 147 | 9.76 | 9.13 | 9.4 | 7.8 |
| 168 | | 7.30 | 9.0 | |
| 189 | | 6.60 | 8.5 | |

In the case of the test employing the filter element containing 52 grams of calcium sulfide, approximately 210 hours of operation were required to reduce the over-all average merit rating to 7.0. In the case of the test carried out using sand in like amount in the filter element, about 155 hours of test time were required to reach a merit over-all rating of 7.0. In the case of the test employing the filter containing 52 grams of calcium hypophosphite, approximately 225 hours of operation were required to reduce the overall average merit rating to 7.0. The ferric hypophosphite test compared to the calcium hypophosphite test, shows that the cation, if in its highest valence state, does not affect the final beneficial results which are substantially the same if the same anion is present. It is readily apparent from an examination of these data that there is a vast difference in sludge formation and deposition as between the engine operated with a filter containing calcium sulfide, calcium hypophosphite, or ferric hypophosphite versus, in effect, the use of a filter containing no reducing additive, i.e., sand, which was inert.

Having set forth the general nature and specific embodiments of the invention, what is desired to be secured by Letters Patent is:

1. In a lubricating oil system for lubricating internal combustion engines with a mineral lubricating oil and involving the circulation of such oils, the improvement which comprises: employing a solids-oil contacting chamber in the oil circulating system, containing at least one relatively oil-insoluble solid inorganic reducing compound having a cation moiety and an anion moiety wherein at least the anion moiety provides a reducing action and possesses an E° oxidation-reduction potential greater than $-0.8$ if measured in an aqueous acid solution and greater than 0 if measured in an aqueous alkaline solution.

2. In a lubricating oil system for lubricating internal combustion engines with a mineral lubricating oil and involving the circulation of such oils through a filter, the improvement which comprises: employing a filter containing at least one relatively oil-insoluble solid inorganic reducing compound having a cation moiety and an anion moiety wherein the anion moiety provides the reducing action and contains phosphorus having a valence state between −3 and +4 inclusive.

3. In a lubricating oil system for lubricating internal combustion engines with a mineral lubricating oil and involving the circulation of such oils through a filter, the improvement which comprises: employing a filter containing at least one relatively oil-insoluble solid inorganic reducing compound having a cation moiety and an anion moiety wherein the anion moiety provides the reducing action and contains sulfur having a valence state between −2 and +4 inclusive.

4. A system as in claim 1 wherein the anion moiety is selected from the group consisting of phosphides, hypophosphites, metaphosphites, pyrophosphites, orthophosphites, hypophosphates, sulfides, sulfoxylates, hyposulfites, sulphites and dithionites.

5. A system as in claim 4 wherein the cation is selected from the group consisting of hydrogen, ammonium, alkali metal and alkaline earth metal.

6. A system as in claim 1 wherein the inorganic reducing compound is associated with a carrier selected from the group consisting of porous paper, diatomaceous earth, kaolin, kieselguhr, activated clay, charcoal, and fuller's earth.

7. A system as in claim 2 wherein the phosphorus reducing compound is associated with a carrier selected from the group consisting of porous paper, diatomaceous earth, kaolin, kieselguhr, activated clay, charcoal, and fuller's earth.

8. A system as in claim 3 wherein the sulfur reducing compound is associated with a carrier selected from the group consisting of porous paper, diatomaceous earth, kaolin, kieselguhr, activated clay, charcoal, and fuller's earth.

9. A system as in claim 2 wherein the reducing commound is calcium hypophosphite.

10. A system as in claim 2 wherein the reducing compound is ferric hypophosphite.

11. A system as in claim 3 wherein the reducing compound is calcium sulfide.

12. A system as in claim 5 wherein the reducing compound is calcium hypophosphite.

13. A system as in claim 5 wherein the reducing compound is calcium sulfide.

14. A system as in claim 6 wherein the reducing compound is ferric hypophosphite.

15. An oil filter through which circulating mineral lubricating oil is employed in connection with the operation of internal combustion engines is passed, containing at least one relatively oil-insoluble solid inorganic reducing compound having a cation moiety and an anion moiety wherein at least the anion moiety provides a reducing action and possesses an $E°$ oxidation-reduction potential greater than −0.8 if measured in an aqueous acid solution and greater than 0 if measured in an aqueous alkaline solution.

16. An oil filter as in claim 15 containing at least one relatively oil-insoluble solid inorganic reducing compound having a cation moiety and an anion moiety wherein the anion moiety provide the reducing action and contains phosphorus having a valence state between −3 and +4 inclusive.

17. An oil filter as in claim 15 containing at least one relatively oil-insoluble solid inorganic reducing compound having a cation moiety and an anion moiety wherein the anion moiety provides the reducing action and contains sulfur having a valence state between −2 and +4 inclusive.

18. An oil filter as in claim 15 wherein the anion moiety is selected from the group consisting of phosphides, hypophophites, metaphosphites, pyrophophites, orthophosphites, hypophosphates, sulfides, sulfoxylates, hyposulfites, sulphites, and dithionites.

19. An oil filter as in claim 18 wherein the cation is selected from the group consisting of hydrogen, ammonium, alkali metal and alkaline earth metal.

20. An oil filter as in claim 15 wherein the inorganic reducing compound is in association with a carrier selected from the group consisting of porous paper, diatomaceous earth, kaolin, kieselguhr, activated clay, charcoal, and fuller's earth.

21. An oil filter as in claim 16 wherein the phosphorus reducing compound is in association with a carrier selected from the group consisting of porous paper, diatomaceous earth, kaolin, kieselguhr, activated clay, charcoal, and fuller's earth.

22. An oil filter as in claim 17 wherein the sulfur-containing reducing compound is in association with a carrier selected from the group consisting of porous paper, diatomaceous earth, kaolin, kieselguhr, activated clay, charcoal, and fuller's earth.

23. An oil filter as in claim 16 wherein the reducing compound is calcium hypophosphite.

24. An oil filter as in claim 16 wherein the reducing compound is ferric hypophosphite.

25. An oil filter as in claim 17 wherein the reducing compound is calcium sulfide.

26. An oil filter as in claim 19 wherein the reducing compound is calcium hypophosphite.

27. An oil filter as in claim 19 wherein the reducing compound is calcium sulfide.

28. An oil filter as in claim 20 wherein the reducing compound is ferric hypophosphite.

References Cited

UNITED STATES PATENTS

| | | | |
|---|---|---|---|
| 1,594,335 | 7/1926 | Sweetland | 208—179 |
| 3,080,214 | 3/1963 | Duke et al. | 210—502 |
| 3,278,040 | 10/1966 | Goldberg et al. | 210—502 |
| 1,914,999 | 6/1933 | Maverick et al. | 208—183 |
| 2,262,526 | 11/1941 | Fairlie et al. | 123—196 |
| 2,310,305 | 2/1943 | Miller et al. | 123—196 |
| 2,455,659 | 12/1948 | Duncan et al. | 252—33 |
| 2,842,112 | 6/1958 | Phillips et al. | 123—196 |
| 2,852,454 | 9/1958 | Puddington et al. | 204—136 |
| 3,000,819 | 9/1961 | Norton et al. | 252—25 |
| 3,336,223 | 8/1967 | Kneeland | 252—9 |

HERBERT LEVINE, Primary Examiner

U.S. Cl. X.R.

123—196; 208—183; 210—501